(12) United States Patent
Zhang et al.

(10) Patent No.: US 11,543,034 B2
(45) Date of Patent: Jan. 3, 2023

(54) LABYRINTH SEALING DEVICE FOR REDUCING GAS INTRUSION

(71) Applicant: Nanjing University of Aeronautics and Astronautics, Nanjing (CN)

(72) Inventors: Bo Zhang, Nanjing (CN); Yuanxiang Chen, Nanjing (CN); Zhiguo Wang, Nanjing (CN); Honghu Ji, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/615,114

(22) PCT Filed: Sep. 27, 2020

(86) PCT No.: PCT/CN2020/118052
§ 371 (c)(1),
(2) Date: Nov. 30, 2021

(87) PCT Pub. No.: WO2021/120772
PCT Pub. Date: Jun. 24, 2021

(65) Prior Publication Data
US 2022/0349480 A1   Nov. 3, 2022

(30) Foreign Application Priority Data
Dec. 20, 2019   (CN) .......................... 201911327657.8

(51) Int. Cl.
*F16J 15/447*   (2006.01)
(52) U.S. Cl.
CPC ................. *F16J 15/4472* (2013.01)

(58) Field of Classification Search
CPC ................................................. F16J 15/4472
See application file for complete search history.

(56) References Cited

U.S. PATENT DOCUMENTS 2,738,949 A    3/1956  Wilkinson
3,940,153 A *  2/1976  Stocker ................ F16J 15/4472
                                                            277/418

(Continued)

FOREIGN PATENT DOCUMENTS

CN    104747314 A    7/2015
CN    104895624 A    9/2015

(Continued)

OTHER PUBLICATIONS

Tong Fei, et al., Numerical Investigation of Protrusions on Leakage of Straight-Through Labyrinth Seal, Journal Of Propulsion Technology, 2015, pp. 119-123, vol. 36 No. 1.

*Primary Examiner* — Vishal A Patel
(74) *Attorney, Agent, or Firm* — Bayramoglu Law Offices LLC

(57) ABSTRACT

A labyrinth sealing device for reducing gas intrusion is provided. A sealing bush is provided with a jet hole at the front of a tooth tip gap. The jet hole faces a tip of a corresponding sealing tooth. A gas flow injected by the jet hole suppresses hot gas flowing into the tooth tip gap. The sealing bush is provided with a first intercepting member at the rear of the tooth tip gap, and the sealing tooth is provided with a second intercepting member at the rear of the tooth tip gap. The first intercepting member hinders hot gas flowing against an inner wall of the sealing bush, and the second intercepting member hinders hot gas flowing against the sealing tooth, such that a part of the hot gas flows in a reverse direction and is violently mixed with subsequent hot gas.

7 Claims, 1 Drawing Sheet

(56) References Cited

U.S. PATENT DOCUMENTS

| | | | | | |
|---|---|---|---|---|---|
| 4,513,975 | A | * | 4/1985 | Hauser | F01D 11/04 415/174.4 |
| 4,721,313 | A | * | 1/1988 | Pennink | F16J 15/443 277/412 |
| 4,884,820 | A | * | 12/1989 | Jackson | F01D 5/20 415/173.5 |
| 5,161,943 | A | * | 11/1992 | Maier | F01D 11/02 277/412 |
| 2012/0091662 | A1 | * | 4/2012 | Neeli | F01D 11/02 277/420 |
| 2014/0072415 | A1 | * | 3/2014 | Zheng | F01D 11/08 277/412 |

FOREIGN PATENT DOCUMENTS

| | | |
|---|---|---|
| CN | 105041479 A | 11/2015 |
| CN | 204921170 U | 12/2015 |
| CN | 207034184 U | 2/2018 |
| CN | 109139269 A | 1/2019 |
| CN | 208519179 U | 2/2019 |
| CN | 111140289 A | 5/2020 |
| EP | 2669555 A1 | 12/2013 |
| GB | 2469368 A | 10/2010 |

\* cited by examiner

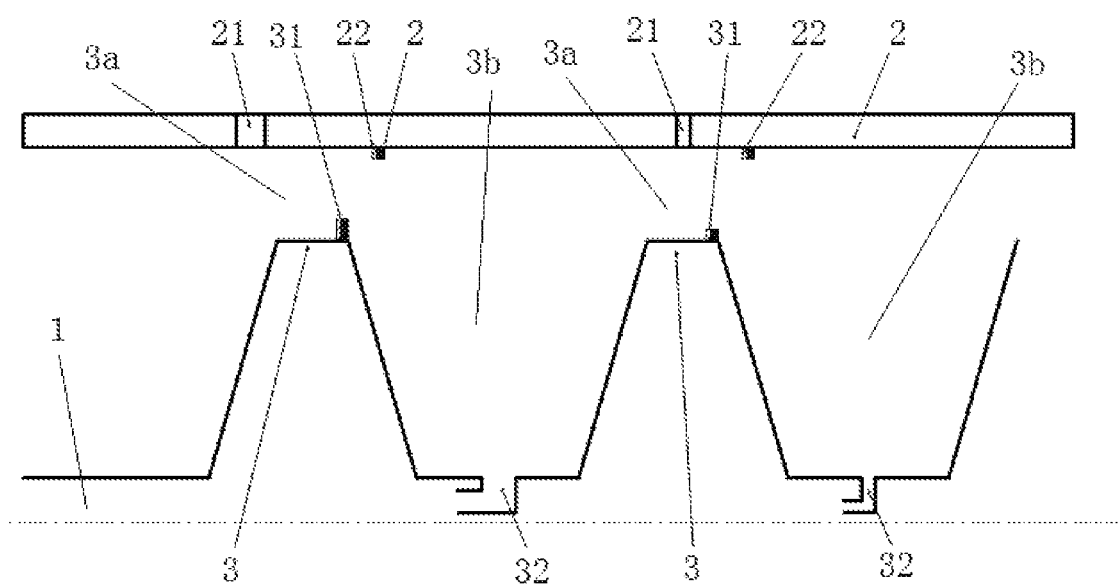

LABYRINTH SEALING DEVICE FOR REDUCING GAS INTRUSION

CROSS REFERENCE TO THE RELATED APPLICATIONS

This application is the national phase entry of International Application No. PCT/CN2020/118052, filed on Sep. 27, 2020, which is based upon and claims priority to Chinese Patent Application No. 201911327657.8, filed on Dec. 20, 2019, the entire contents of which are incorporated herein by reference.

TECHNICAL FIELD

The present invention relates to the field of aircraft scanning engineering, and more particularly, to a labyrinth sealing device for reducing gas intrusion.

BACKGROUND

With the development of the aviation industry, the requirements for maneuverability, reliability and economy of aircraft are becoming increasingly high. To meet the high-performance requirements of the engine, it is urgently necessary to improve the various components of the aero-engine. Low fuel consumption, high thrust ratio, high reliability and durability are the development trends of the modern aviation gas turbine engine. However, as the internal temperature and the pressure ratio of the engine gradually increase, the leakage of the internal flow system is becoming increasingly serious. Therefore, the sealing performance directly affects the fuel consumption rate, flight cost and thrust-to-weight ratio of the aero-engine. In order to reduce the leakage loss and improve the overall performance of the engine, it is particularly vital to improve the original sealing devices at multiple locations. In Chinese and other countries, many studies have shown that the performance improvement of the aero-engine in the future will substantially depend on the improvement of sealing technology and the reduction of leakage. Therefore, it is highly desirable to develop a high-performance sealing structure, and the improvement and development of a sealing device has important practical value and significance for reducing fuel consumption and improving engine efficiency.

SUMMARY

In order to solve the problems mentioned in the background, an objective of the present invention is to provide a labyrinth sealing device, which can effectively reduce hot gas from intruding into a turbine component and effectively improve labyrinth sealing performance.

To achieve the above objective, the present invention adopts the following technical solution:

A labyrinth sealing device for reducing gas intrusion includes a rotating shaft, where a sealing bush is coaxially sleeved outside the rotating shaft; a plurality of sealing teeth are axially arranged on the rotating shaft; an outer peripheral surface of each of the sealing teeth is in a clearance fit with an inner ring surface of the sealing bush, such that a tooth tip gap is formed between a tip of each of the sealing teeth and the inner ring surface of the sealing bush; a tooth cavity is formed between adjacent sealing teeth; the sealing bush is provided with a jet hole at the front of the tooth tip gap; the jet hole faces the tip of a corresponding sealing tooth; a gas flow injected by the jet hole suppresses hot gas flowing into the tooth tip gap; the sealing bush is provided with a first intercepting member at the rear of the tooth tip gap; the first intercepting member hinders hot gas flowing against an inner wall of the sealing bush, such that a part of the hot gas flows in a reverse direction and is violently mixed with subsequent hot gas; each of the sealing teeth is provided with a second intercepting member at the rear of the tooth tip gap; and the second intercepting member hinders hot gas flowing against a corresponding sealing tooth, such that a part of the hot gas flows in a reverse direction and is violently mixed with subsequent hot gas.

In order to optimize the above technical solution, the present invention further adopts the following measures:

An elastic diaphragm may be provided on a front side, i.e., a windward side, of the first intercepting member and the second intercepting member, respectively.

Jet holes may be respectively arranged at the fronts of tooth tip gaps, and first intercepting members and second intercepting members may be respectively arranged at the rear of each of the tooth tip gaps; apertures of the jet holes, heights of the first intercepting members and heights of the second intercepting members gradually decrease from front to rear; and the aperture of a first jet hole may be one third of a tip width of a corresponding sealing tooth.

The first intercepting members and the second intercepting members may be rectangular intercepting members.

A mixing hole may be provided at the bottom of the tooth cavity, and the mixing hole may be configured to inject a gas flow into the tooth cavity to consume kinetic energy of hot gas in the tooth cavity.

The gas flow injected by the mixing hole may be low-temperature argon.

Mixing holes may be respectively arranged at the bottoms of tooth cavities, and apertures of the mixing holes of different tooth cavities gradually decrease from front to rear.

The gas flow injected by the jet holes may be low-temperature argon.

The number of sealing teeth may be three; and correspondingly, the number of tooth tip gaps may be three and the number of tooth cavities may be two.

In the present invention, a low-temperature inert gas jet is introduced at a position of the sealing bush corresponding to the sealing tooth tip to suppress a hot gas leakage flow at the sealing tooth tip and make it flow against a wall of the tooth tip. The rectangular elastic intercepting members on the tooth tip and the sealing bush hinder the jet at the tooth tip and inhibit the flow of the hot gas and the jet at the tooth tip. In this way, the present invention reduces hot gas intrusion. Meanwhile, the present invention cools the hot gas through mixing so as to weaken the damage of the intruding hot gas to a downstream component. Regarding hot gas entering the tooth cavity, the present invention mixes the hot gas with a jet introduced from outside the tooth cavity, thereby reducing the kinetic energy of the hot gas. In this process, the present invention uses an inert gas so as to avoid secondary combustion in the flow of the hot gas.

BRIEF DESCRIPTION OF THE DRAWINGS

FIGURE is a structural diagram of the present invention.

Reference Numerals: 1. rotating shaft; 2. sealing bush; 21. jet hole; 22. first intercepting member; 3. sealing tooth; 3a. tooth tip gap; 3b. tooth cavity; 31. second intercepting member; and 32. mixing hole.

DETAILED DESCRIPTION OF THE EMBODIMENTS

The embodiments of the present invention are further described in detail below with reference to the drawings.

An embodiment provides a labyrinth sealing device for reducing gas intrusion. The labyrinth sealing device includes a rotating shaft 1. A sealing bush 2 is coaxially sleeved outside the rotating shaft 1. A plurality of sealing teeth 3 are axially arranged on the rotating shaft 1. An outer peripheral surface of each of the sealing teeth 3 is in a clearance fit with an inner ring surface of the sealing bush 2, such that a tooth tip gap 3a is formed between a tip of each of the sealing teeth 3 and the inner ring surface of the sealing bush 2. A tooth cavity 3b is formed between adjacent sealing teeth 3. The sealing bush 2 is provided with a jet hole 21 at the front of the tooth tip gap 3a. The jet hole 21 faces the tip of a corresponding sealing tooth 3. A gas flow injected by the jet hole 21 suppresses hot gas flowing into the tooth tip gap 3a. The sealing bush 2 is provided with a first intercepting member 22 at the rear of the tooth tip gap 3a. The first intercepting member 22 hinders hot gas flowing against an inner wall of the sealing bush 2, such that a part of the hot gas flows in a reverse direction and is violently mixed with subsequent hot gas. Each of the sealing teeth 3 is provided with a second intercepting member 31 at the rear of the tooth tip gap 3a. The second intercepting member 31 hinders hot gas flowing against a corresponding sealing tooth 3, such that a part of the hot gas flows in a reverse direction and is violently mixed with subsequent hot gas.

In this embodiment, an elastic diaphragm is provided on a front side windward side of the first intercepting member 22 and the second intercepting member 31, respectively.

In this embodiment, jet holes 21 are respectively arranged at the fronts of tooth tip gaps 3a, and first intercepting members 22 and second intercepting members 31 are respectively arranged at the rear of each of the tooth tip gaps; apertures of the jet holes 21, heights of the first intercepting members 22 and heights of the second intercepting members 31 gradually decrease from front to rear. The aperture of a first jet hole 21 is one third of a tip width of a corresponding sealing tooth 3.

In this embodiment, the first intercepting members 22 and the second intercepting members 31 are rectangular intercepting members.

In this embodiment, a mixing hole 32 is provided at the bottom of the tooth cavity 3b, and the mixing hole 32 is configured to inject a gas flow into the tooth cavity 3b to consume kinetic energy of hot gas in the tooth cavity 3b. The mixing holes 32 are circular holes, and the aperture of the first mixing hole 32 is equal to ¼ of a bottom width of the tooth cavity 3b.

In this embodiment, the gas flow injected by the mixing hole 32 is low-temperature argon.

In this embodiment, mixing holes 32 are respectively arranged at the bottoms of tooth cavities 3b, and apertures of the mixing holes 32 of different tooth cavities 3b gradually decrease from front to rear.

In this embodiment, the gas flow injected by the jet holes 21 is low-temperature argon.

In this embodiment, the number of sealing teeth 3 is three; and correspondingly, the number of tooth tip gaps 3a is three and the number of tooth cavities 3b is two.

This embodiment provides a sealing structure that suppresses the intrusion of a hot gas flow by combining jet injection and labyrinth sealing. The labyrinth sealing device adopts three trapezoidal sealing teeth, and introduces two jets from the sealing bush and two jets from the tooth cavities, which achieves the purpose of preventing or weakening hot gas intrusion. The labyrinth seal forms a sudden contraction/expansion throttling device in the flow channel to prevent the gas flow from intruding. A circular jet hole 21 is provided at a front edge of the sealing bush 2 above the tip of a first-stage sealing tooth 3. The aperture of the jet hole is equal to ⅓ of the tip width. The jet hole is used to suppress the hot gas flow at the tooth tip to deflect downward, thereby reducing the flow area. A second rectangular intercepting member 31 is provided at a rear edge of the tip of the first-stage sealing tooth 3, which is welded to the sealing tooth 3. The sealing bush 2 is provided with a first rectangular intercepting member 22 at a downstream position corresponding to the sealing tooth 3, which is at a distance of 5-6 times of the aperture of the jet hole 21. The first rectangular intercepting member hinders hot gas flowing against a wall, such that a part of the hot gas flows in a reverse direction and is violently mixed with subsequent hot gas, thereby realizing energy dissipation. The sudden expansion flow of the hot gas has an instantaneous pulsation characteristic. Based on this, elastic foils are provided on the front side, i.e., a windward side, of the first rectangular intercepting member 22 and the second rectangular intercepting member 31, respectively. The elastic foils are respectively welded to the first rectangular intercepting member 22 and the second rectangular intercepting member 31. Through an elastic force of the elastic foils, the reverse flow rate is increased, and the fluid mixing is promoted. Regarding the hot gas flowing into the tooth cavity 3b, the mixing of the hot gas is promoted by the tooth cavity jet, so as to achieve the purpose of consuming the kinetic energy of the hot gas, reducing intrusion and cooling.

In the whole solution, the jet is low-temperature argon. Argon can hinder the flow of the hot gas and weaken hot gas intrusion. The low-temperature jet can also be mixed with the hot gas to cool the hot gas, thereby reducing the damage of the hot gas to a component. In addition, it also avoids the problem of secondary combustion of unburned intruding hot gas and oxygen in the air.

The above described are only preferred implementations of the present invention, and the scope of the present invention is not limited thereto. All technical solutions based on the idea of the present invention should fall within the protection scope of the present invention. It should be pointed out that for a person of ordinary skilled in the art, several improvements and modifications may further be made without departing from the principle of the present invention, but the improvements and modifications should be deemed as falling within the protection scope of the present invention.

What is claimed is:

1. A labyrinth sealing device for reducing gas intrusion, comprising a rotating shaft, wherein a sealing bush is coaxially sleeved outside the rotating shaft; a plurality of sealing teeth are axially arranged on the rotating shaft; an outer peripheral surface of each of the plurality of sealing teeth is in a clearance fit with an inner ring surface of the sealing bush, wherein a tooth tip gap is formed between a tip of each of the plurality of sealing teeth and the inner ring surface of the sealing bush; a tooth cavity is formed between adjacent sealing teeth; the sealing bush is provided with plurality of jet hole at front of each of the tooth tip gap; the jet holes faces the tip of a corresponding sealing tooth; a gas flow injected by the jet hole suppresses hot gas flowing into the tooth tip gap; the sealing bush is provided with plurality of first intercepting member at rear of each of the tooth tip gap; the first intercepting members hinder hot gas flowing against an inner wall of the sealing bush, wherein a part of the hot gas flows in a reverse direction and is violently mixed with subsequent hot gas; each tooth of the plurality of sealing teeth is provided with a second intercepting member at the rear of each of the tooth tip gap; and the second intercepting member hinders hot gas flowing against a corresponding sealing tooth, wherein a part of the hot gas flows in a reverse direction and is violently mixed with subsequent hot gas;

wherein the jet holes are respectively arranged at fronts of the tooth tip gaps, and the first intercepting members and the second intercepting members are respectively arranged at the rear of each of the tooth tip gaps; apertures of the jet holes, heights of the first intercepting members and heights of the second intercepting members gradually decrease from the front to the rear; and an aperture of one of the jet holes is one third of a tip width of a corresponding sealing tooth; and wherein mixing holes are respectively arranged at bottoms of the tooth cavities, and apertures of the mixing holes of different tooth cavities gradually decrease from the front to the rear.

2. The labyrinth sealing device for reducing the gas intrusion according to claim 1, wherein an elastic diaphragm is provided on a front side, of the first intercepting member and the second intercepting member, respectively.

3. The labyrinth sealing device for reducing the gas intrusion according to claim 1, wherein the first intercepting members and the second intercepting members are rectangular intercepting members.

4. The labyrinth sealing device for reducing the gas intrusion according to claim 1, wherein the mixing hole is configured to inject a gas flow into the tooth cavity to consume kinetic energy of hot gas in the tooth cavity.

5. The labyrinth sealing device for reducing the gas intrusion according to claim 4, wherein the gas flow injected by the mixing hole is low-temperature argon.

6. The labyrinth sealing device for reducing the gas intrusion according to claim 1, wherein the gas flow injected by the jet holes is low-temperature argon.

7. The labyrinth sealing device for reducing the gas intrusion according to claim 6, wherein the plurality of sealing teeth are three teeth; and correspondingly, a number of the tooth tip gaps are three and a number of the tooth cavities are two.

* * * * *